United States Patent
Wang

(10) Patent No.: US 9,265,011 B2
(45) Date of Patent: Feb. 16, 2016

(54) ADAPTIVE REMOTE WI-FI CLIENT POWER CONTROL TO AVOID LOCAL RECEIVER DESENSE

(71) Applicant: QUALCOMM Incorporated, San Diego, CA (US)

(72) Inventor: Jibing Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 130 days.

(21) Appl. No.: 14/088,991

(22) Filed: Nov. 25, 2013

(65) Prior Publication Data

US 2015/0146548 A1    May 28, 2015

(51) Int. Cl.
  *H04W 52/04*   (2009.01)
  *H04W 52/24*   (2009.01)
  *H04J 3/16*    (2006.01)

(52) U.S. Cl.
  CPC ............ *H04W 52/245* (2013.01); *H04W 52/04* (2013.01)

(58) Field of Classification Search
  None
  See application file for complete search history.

(56) References Cited

U.S. PATENT DOCUMENTS

| | | | |
|---|---|---|---|
| 5,333,175 A * | 7/1994 | Ariyavisitakul et al. | 455/423 |
| 7,450,522 B2 * | 11/2008 | Feder et al. | 370/252 |
| 8,305,972 B2 * | 11/2012 | Baker et al. | 370/329 |
| 8,879,479 B2 * | 11/2014 | Baker et al. | 370/329 |
| 2002/0123319 A1 * | 9/2002 | Peterzell | 455/296 |
| 2009/0185518 A1 * | 7/2009 | Viswanath | 370/311 |
| 2011/0059762 A1 * | 3/2011 | Jones et al. | 455/522 |
| 2011/0081858 A1 * | 4/2011 | Tolentino | H04B 15/00 455/41.2 |
| 2012/0243633 A1 | 9/2012 | Herrick | |
| 2013/0017794 A1 | 1/2013 | Kloper et al. | |
| 2013/0064111 A1 | 3/2013 | Linsky et al. | |
| 2013/0128755 A1 | 5/2013 | Ullah et al. | |
| 2013/0136016 A1 * | 5/2013 | Lee et al. | 370/252 |

* cited by examiner

*Primary Examiner* — Eunsook Choi

(74) *Attorney, Agent, or Firm* — Bay Area Technology Law Group PC

(57) ABSTRACT

A method and apparatus for communicating in a wireless network includes an AP having multiple radios, a first one of which communicates with a nearby client node and a second one of which receives power on another wireless protocol operating in the same or close frequency band as the first radio. The first radio is configured to remotely control the transmit power of the client node so that it doesn't interfere with the reception performance of the second radio. A beacon or probe response frame is used to reduce transmit power of the client node and a CTS2S signal is used to selectively terminate client node transmit power entirely over short periods so that the reception performance of the other wireless device is not severely compromised or desensed by the client node and can be evaluated according to comparative performance criteria such as signal to interference plus noise ratio.

27 Claims, 3 Drawing Sheets

ADAPTIVE REMOTE WI-FI CLIENT POWER CONTROL TO AVOID LOCAL RECEIVER DESENSE

FIELD OF PRESENT DISCLOSURE

The present description is related, generally to multi-radio techniques and, more specifically, to a method and apparatus for accommodating multi-radio devices in a wireless network.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmission on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

Some conventional advanced devices include multiple radios for transmitting/receiving using different Radio Access Technologies (RATs). Examples of RATs include, e.g., Universal Mobile Telecommunications Systems (UMTS), Global System for Mobile Communications (GSM), cdma2000, worldwide interoperability for microwave access (WiMAX), WLAN (e.g., Wi-Fi), Bluetooth®, LTE, and the like.

An example of a mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (Wi-Fi) radio, a Global Positioning System (GPS) radio, and a Bluetooth radio, where two of the above or all four may operate simultaneously. While the different radios provide useful functionalities for the phone, their inclusion in a single device gives rise to interference issues. Specifically, operation of one radio may in some cases interfere with operation of another radio.

SUMMARY

According to one aspect of the disclosure, a method of communicating in a wireless network includes remotely controlling the power transmit by a Wi-Fi client wherein a Wi-Fi-Direct or WiFi Peer-to-Peer (P2P) or Soft AP (software enabled access point) may employ a beacon frame or probe response frame to remotely reduce maximum transmit power level of an associated station. This may be done to prevent desensing the receive function of a wireless wide area network (WWAN) (or Bluetooth) receiver in a multiple radio configuration, where the peer Wi-Fi client is sufficiently proximate the WWAN to otherwise detrimentally affect its performance by transmitting in the same or close frequency band.

According to another aspect of the disclosure, an apparatus for communicating in a wireless network includes an access point (AP) having multiple radios, a first one of which communicates with a nearby client node and a second one of which receives power on another wireless protocol operating in the same or close frequency band as the first radio. The first radio is configured to remotely control the transmit power of the client node so that it doesn't interfere with the reception performance of the second radio.

According to still another aspect of the disclosure, an apparatus for communicating in a wireless network includes an AP having multiple radios, a first one of which communicates with a nearby client node and a second one of which receives power on another wireless protocol operating in the same or close frequency band as the first radio. The first radio is configured to monitor the strength of the signal received by the first radio and determine whether the strength exceeds a pre-selected threshold and remotely reduce the transmit power of the nearby client node accordingly. In this aspect of the disclosure, the aforementioned apparatus is also configured to monitor reception performance criteria of the second radio while the client node is transmitting and then not transmitting and compare the two performance criteria to determine whether to further reduce the transmit power of the client node.

According to yet another aspect of the disclosure, an apparatus for communicating in a wireless network includes an AP having multiple wireless devices one of which devices can remotely control the transmit power of a client node including the use of beacon or probe response frames to reduce transmit power of the client node and a clear to send to self (CTS2S) signal to selectively terminate client node transmit power entirely so that the reception performance of the other wireless device is not severely compromised or desensed by the client node and can be evaluated according to comparative performance criteria.

When a Wi-Fi client STA is close to a Soft AP or peer-to-peer group owner (P2PGO), the Wi-Fi client may desense reception by another collocated radio on the AP device. A desense problem may also occur using a Bluetooth receiver in the vicinity of a peer Wi-Fi client. The disclosed scheme may prevent such desense problems by remotely causing a reduction or back off in transmit (Tx) power of the peer Wi-Fi device. The Soft AP or P2PGo will monitor the received signal strength indicator (RSSI) of the Wi-Fi receiver so that if it exceeds a threshold level, the transmit (Tx) power of the Wi-Fi client device will be reduced to prevent reception desense at the second collocated radio on the AP device. The amount of power reduction may be determined by a comparison of performance statistics such as signal to interference plus noise ratio (SINR) or packet error ratio (PER), with the peer Wi-Fi device 1) transmitting and 2) being blocked from transmission. CTS2S can be employed by the AP's Wi-Fi to briefly block transmission by the peer Wi-Fi device and thus facilitate the comparison of statistics to determine the amount of Tx power reduction that may be required to prevent interference with reception by the second collocated radio on the AP device.

In a typical scenario, the Soft AP or P2PGO is within about 1 meter of the client and is monitoring the latter's RSSI. If a pre-determined threshold is exceeded, the AP will transmit one of the following elements in beacon frames or probe response frames to back off maximum transmit power in the Wi-Fi station STA:

Country element
  Power Constraint element
  VHT Transmit Power element
  Extended Power Constraint element.

Performance comparison with and without transmission from a client Wi-Fi station is initiated to determine the amount of reduction or back off to prevent desense of another collocated radio on the same device. When the performance comparison such as SINR or PER shows little or no difference in performance (such as <0.5 dB) between the second radio reception with and without client transmission, client Wi-Fi Tx power reduction is halted. This scheme will also avoid desense problems caused by transmission by remote Wi-Fi devices on local Bluetooth receivers.

Method steps of the disclosed embodiment comprise monitoring RSSI until it exceeds a pre-determined threshold. If it does exceed the threshold, the maximum Wi-Fi Tx power is reduced by the AP by transmitting at least one of the above-noted beacon or probe response frame elements. Performance, with and without client Tx, is then initiated to compare a statistical parameter such as signal to interference plus noise ratio, or packet error ratio. When performance is acceptable, such as within 0.5 dB of client no-transmission performance, the reduction in client Tx power is ended. Performance monitoring may use CTS2S to intermittently block client Wi-Fi transmission.

BRIEF DESCRIPTION OF THE DRAWINGS

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

Figure 1:
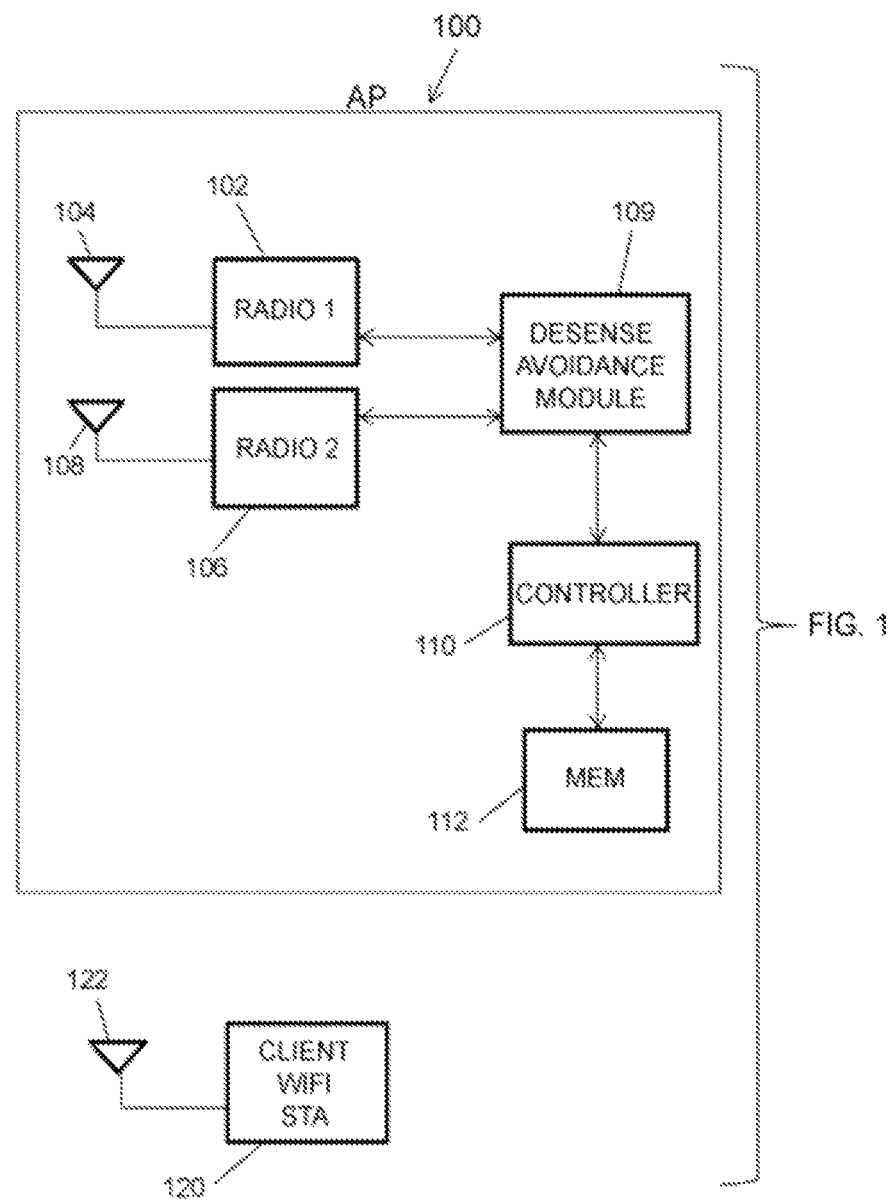
FIG. 1 is a block diagram which illustrates a multi-radio wireless communication system according to one aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component", "module", "system", and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node 4, or some other terminology.

Moreover, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband CDMA (W-CDMA). CDMA2000 covers IS-2000, IS-95 and technology such as Global System for Mobile Communications (GSM).

An OFDMA network may implement a radio technology such as Evolved UTRA (E-UTRA), the Institute of Electrical and Electronics Engineers (IEEE) 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA, UTRA, E-UTRA, GSM, UMTS and LTE are described in documents from an organization named "3rd Generation Partnership Project" (3GPP), CDMA2000 is described in documents from an organization named "3rd Generation Partnership Project 2) (3GPP2). These various radio technologies and standards are known in the art. The techniques described herein may be utilized in various applications involving wireless transmissions, such as personal area networks (PANs), body area networks (BANs), location, Bluetooth®, global positioning system (GPS), ultra-wideband (UWB), radio frequency identification (RFID), and the like. Further, the techniques may also be utilized in wired systems, such as cable modems, fiber-based systems, and the like.

Wireless networks such as those described above, are increasingly being used in conjunction with smaller local networks for internet access and other services. Wi-Fi is one example of such local networks. Wi-Fi is a popular technology that allows an electronic device to exchange data wirelessly (using radio waves) over a computer network, including high-speed Internet connections. The Wi-Fi Alliance defines Wi-Fi as "any wireless local area network (WLAN) product that is based on the Institute of Electrical and Electronics Engineers (IEEE) 802.11 standards".

A device that may use Wi-Fi may be a personal computer, video game console, smartphone or digital audio player. The device connects to a network resource such as the Internet via a wireless network access point. Such an access point may also be known as a hotspot. These access points have a range of approximately 65 feet indoors with a range slightly greater outdoors. Hotspot coverage may comprise an area as small as a single room with walls that block radio waves or may be as large as several miles when overlapping access points are connected.

Wi-Fi technologies based on the IEEE 802.11 standard are enforced by the Wi-Fi Alliance. This includes wireless local area network (WLAN) connections, device to device connectivity (such as Wi-Fi Peer to Peer, also known as Wi-Fi Direct), personal area network (PAN), local area network (LAN) and even some limited wide area network (WAN) connections are covered by the Wi-Fi Alliance and versions of IEEE 802.11.

In order to connect to a Wi-Fi LAN, a computer or other device must be equipped with a wireless network interface controller. The combination of the computer and device may be known as a station (or a STA). All stations share a single radio frequency communication channel. Transmission on this channel is received by all stations within range. The hardware does not signal the user that the transmission was delivered and therefore, the delivery mechanism is known as a "best effort" delivery mechanism. A carrier wave transmits the data in packets, which may be referred to as "Ethernet frames". Each station is constantly tuned to the radio frequency communication channel in order to receive available transmission.

A Wi-Fi enabled device may connect to the Internet or other resource when within range of a wireless network. Wi-Fi may provide service in private homes, coffee shops and other businesses, hospitals and organizations such as airports, hotels and others.

Service is provided by routers that may incorporate a digital subscriber line modem or cable modem that is connected to the Wi-Fi access point. This connection may be either wired or wireless. When subscribed to a cellular phone carrier, access points allow nearby Wi-Fi stations to access the Internet or other network over second, third or fourth generation (2G, 3G, or 4G) networks. Many smartphones also include the capability of serving as a Wi-Fi access point and standalone facilities that provide internet access.

As used herein, the term "desense" encompasses degradation in receiver sensitivity due to interference. Such interference may be due to in-band signals from an alternative transmission source. Such signals may be occurring either as a result of such alternative source operating in the same or close channel or as a result of harmonics or frequency multiple remnants of the intentional frequency falling into the receiver's operating band.

Referring to FIG. 1, a multiple radio wireless communication system according to one aspect is illustrated. A wireless network access point (AP) 100 is shown in conjunction with a client Wi-Fi station (STA) 120 with which the AP 100 may be in communication. The AP 100 may employ a radio 102 (labeled RADIO 1 in FIG. 1) and an associated antenna 104 for wireless communication with STA 120 through its associated antenna 122. The communications between the AP via RADIO 1 and the STA, is carried out in accordance with the protocol of IEEE standard 802.11. AP 100 may comprise a second radio 106 (RADIO 2 in FIG. 1) and an associated antenna 108. RADIO 2 may be associated with another wireless protocol such as a Bluetooth or long term evolution (LTE) system. In this particular example RADIO 2 receives signals in the same or close frequency band in which RADIO 1 communicates with STA. Consequently, when STA transmits to AP, there is a strong probability that RADIO 2 could be negatively desensed. In accordance with the aspects of this disclosure, the AP 100 comprises a desense avoidance module (DAM) 109 which interfaces with RADIO 1 and RADIO 2 as well as controller 110 and memory storage 112. Controller 110 provides programmed control of the desense avoidance module 109 in accordance with software or firmware programming. Memory storage 112 is employed to store the programming used by the controller 110. Although AP 100 is shown as comprising two ratios, it will be understood that the access point may have a number of radios exceeding two.

Figure 2:
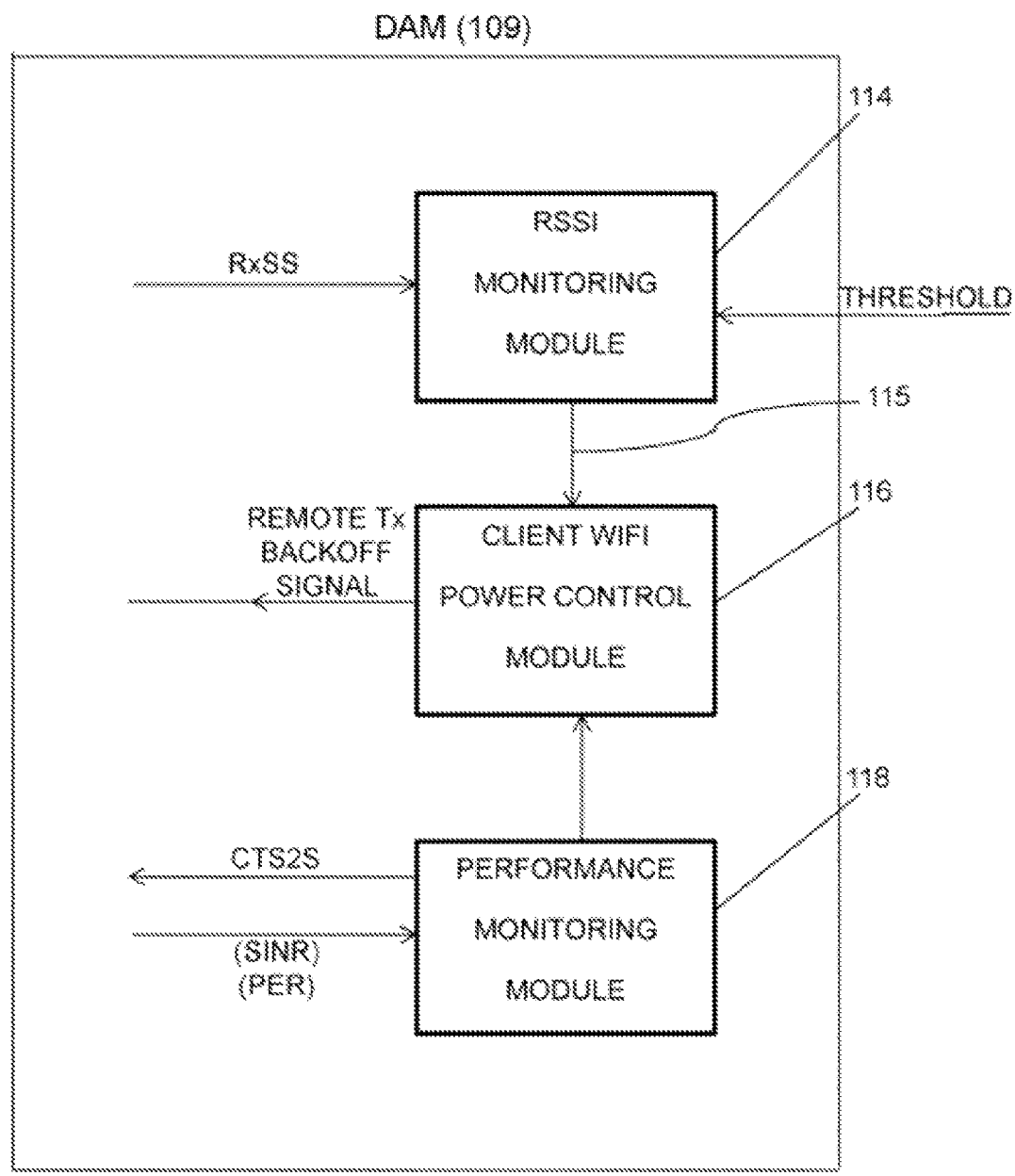
FIG. 2 is a block diagram of a desense avoidance module illustrating a form of signal processing that may be utilized in a disclosed system.

Referring to FIG. 2, the desense avoidance module (DAM) 109 is illustrated according to an exemplary embodiment hereof. DAM 109 may comprise an RSSI Monitoring Module 114; a client Wi-Fi Power Control Module 116 and a Performance Monitoring Module 118.

The function of RSSI Monitoring Module 114 is to provide an indication of received signal strength at the AP 100 via antenna 104 and RADIO 1 and to compare such indication with a threshold input shown in FIG. 2. The threshold may be set at a level which, if exceeded by the received signal strength, would reveal a likelihood of a desensing problem at RADIO 2 receiver. More specifically, if the threshold is exceeded, it would portend a performance problem in the alternate wireless protocol of RADIO 2 which may operate at the same or close frequency but is not part of the wireless network of RADIO 1 (102 and client Wi-Fi STA 120). In order to prevent such a desense event from taking place for any significant amount of time, the RSSI Monitoring Module 114 has an output 115 which is input to Client Power Control Module 116. The function of Module 116 is to recognize a potential desense condition from input 115 and to generate a responsive "Remote Tx Backoff Signal" which may be in the form of an IEEE 802.11 standard beacon frame or probe response frame such as Country element; Power Constraint element; VHT Transmit Power Envelope element; or Extended Power Constrain element. STAs have to be capable of controlling their transmit power to meet regulatory and local maximum limits of transmit power for their current channel. These regulatory and local maximum transmit limits are typically determined by the AP in the STA's BSS and communicated to a STA using a Country information element (regulatory) and a Power Constraint information element (local maximum). Therefore, by control of the AP's Country and Power Constraint information elements, the AP may, in effect, control the transmit power of a remote STA for purposes of this disclosure. The same effect can be realized using probe response frames. Normally, a probe response frame is employed in response to a probe request frame sent by a STA or CLIENT to obtain information from an AP within range of the STA. The typical AP probe response frame may contain synchronization information and AP load and would contain capability information, supported data rates and STA transmit power and power constraints as needed to meet such criteria for the current channel. Thus, probe frames having VHT Transmit Power and Extended Power Constraint parameters can also be employed by the AP to remotely control STA transmit power. This response is applied to RADIO 1 and antenna 104 to communicate to the CLIENT Wi-Fi STA 120 to remotely reduce the maximum power that is transmitted by the STA and thus reduce the corresponding RSSI at module 114 until it falls below the threshold. Thus the desense avoidance module 109 reduces the maximum transmit power of a remote STA to prevent desense problems of an alternate wireless protocol receiver in AP 100. Such Tx power reduction or "backoff" may be assessed for its effectiveness by employing Performance Monitoring Module 118 of FIG. 2. This assessment may be carried out on performance-based statistical parameters of RADIO 2 such as signal to interference plus noise ratio (SINR) or packet error ratio (PER).

A packet error rate (PER) is the number of incorrectly received data packets divided by the total number of received packets. A packet may be considered incorrect if at least one bit is erroneous. Bit errors occur when received data bits are altered due to noise, interference, distortion, bit synchronization errors, alternation, multipath fading or other conditions. Typically, PER depends upon the extent to which signal exceeds noise and interference such as a conflicting signal on a frequency within the current channel. The higher the ratio of signal to interference plus noise (SINR), the lower is PER. Therefore, both PER and SINR may be employed as a measure of receiver performance in a wireless network.

Figure 3:
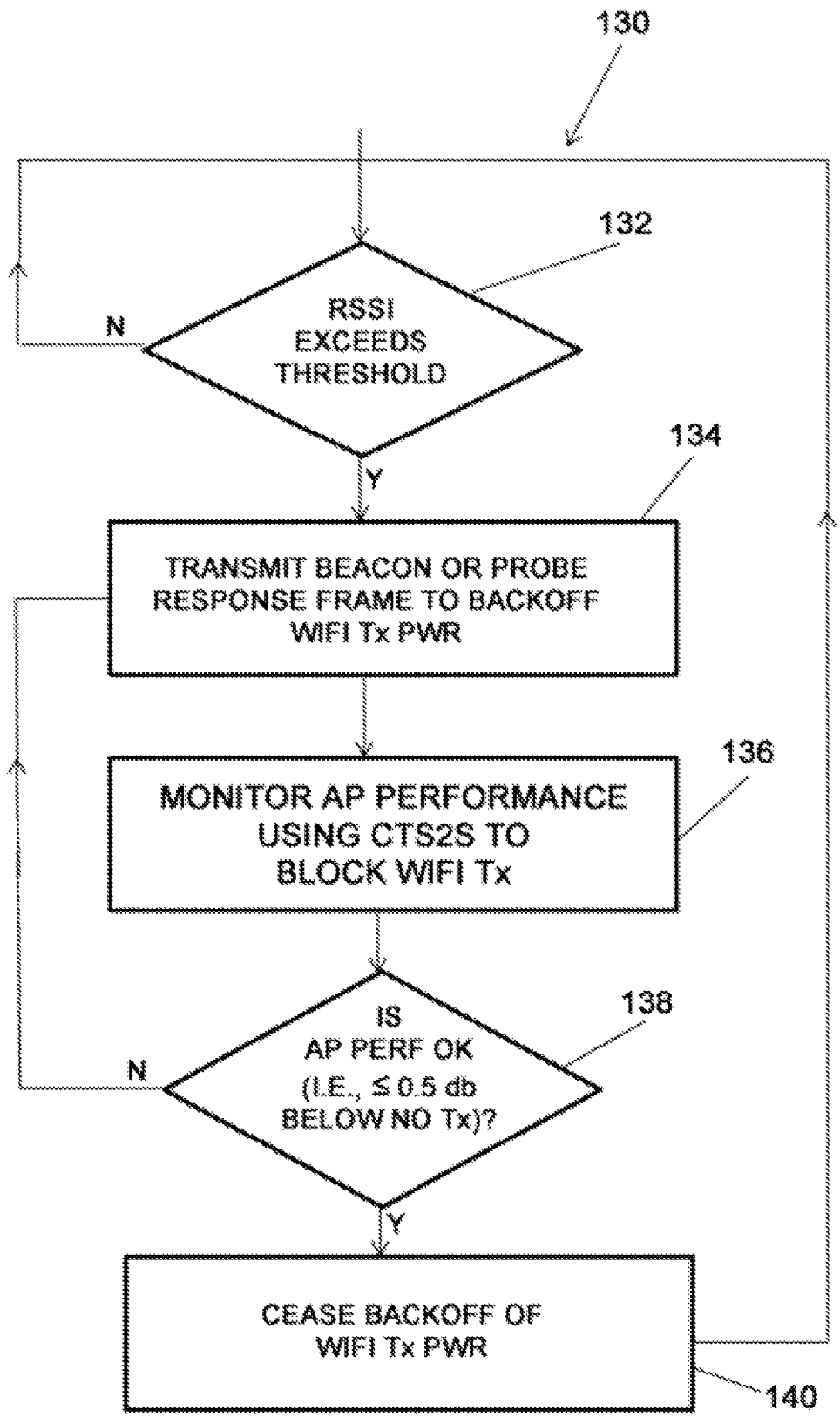
FIG. 3 is a flow chart illustrating features of a method which may be carried out using the module of FIG. 2.

In order to provide a meaningful assessment of such statistical performance so that the need for additional backoff can be gaged, Performance Monitoring Module 118 can generate or cause to be generated a CTS2S signal for transmission by RADIO 1 under the IEEE 802.11 protocol in order to briefly cease transmission by STA. Clear to Send to Self (CTS2S) is a protection mechanism method where an AP is protected by sending a CTS frame that blocks wireless clients from accessing the wireless network for a duration set in the CTS frame. This permits module 118 to evaluate statistical performance with and without STA transmission so that such performance can be compared under conditions of backoff transmission and no transmission. Further STA backoff may be initiated until the performance with and without transmission is sufficiently similar to cease further power reduction from STA. FIG. 3 illustrates these characteristics of the disclosed method hereof. Specifically, as illustrated in the flow chart 130, the method first determines in 132 whether the RSSI of FIG. 2 has exceeded the threshold and if yes then in 134 CLIENT Wi-Fi Tx power is reduced. Then in 136, CTS2S is used intermittently to monitor RADIO 2 reception performance with and without transmission. In 138, a comparison is performed of performance with and without transmission to determine whether to further reduce Wi-Fi Tx power (134) or to cease Wi-Fi Tx backoff power (140). If the difference in performance is small such as less than 0.5 db, additional backoff of Wi-Fi Tx power is terminated. If performance is still being significantly affected, 134 through 138 are repeated until the difference in performance is reduced to a pre-determined acceptable level.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. In a wireless network having at least one access point (AP) and at least one associated Wi-Fi client node, a remote power control method for reducing transmitted power of the client node to reduce desensing reception of a first wireless protocol signal by a collocated radio on the access point; the method comprising:

monitoring a received signal strength indicator horn the client node at the AP for a signal transmitted by the client node using a different protocol than the first wireless protocol and comparing said received signal strength indicator to a pre-determined threshold established with respect to the first wireless protocol;

transmitting a power reduction signal from the AP to the client node which results in a reduction of transmitted power by the client node when said received signal strength indicator is greater than said threshold.

2. The method of claim 1, further comprising:

assessing reception performance of said AP in said first wireless protocol with said client node transmitting at a reduced transmitted power;

assessing the performance of said AP collocated radio with said client node not transmitting;

comparing said performance assessments of said AP collocated radio to determine whether said reduced transmitted power of said client node is affecting the performance of said AP collocated radio; and further reducing the transmitted power of said client node base, at least in part, on said comparing said performance assessments upon determining that performance is still being affected.

3. The method of claim 1 wherein said power reduction signal comprises a beacon frame element.

4. The method of claim 3 wherein said beacon frame element is a Country element.

5. The method of claim 3 wherein said beacon frame element is a Power Constrain element.

6. The method of claim 1 wherein said power reduction signal comprises a probe response frame.

7. The method of claim 6 wherein said probe response frame is a VHT Transmit Power Envelope element.

8. The method of claim 6 wherein said probe response frame is an Extended Power Constraint element.

9. The method of claim 2 wherein said performance assessments are based on signal to interference plus noise ratio.

10. The method of claim 2 wherein said performance assessments are based on packet error ratio.

11. The method of claim 2 wherein said performance assessment with client not transmitting uses a clear to send to self (CTS2S) signal to temporarily block transmitting of the client node.

12. The method of claim 1 wherein said first wireless protocol comprises Bluetooth protocol.

13. The method of claim 1 wherein said first wireless protocol comprises a long term evolution (LTE) system protocol.

14. An apparatus for a wireless network having at least one access point and at least one associated Wi-Fi client node, the apparatus configured for selectively reducing transmitted power of the client node to reduce desensing reception of a first wireless protocol signal by a collocated radio at the access point; the apparatus comprising:
  a received signal strength monitor indicating received signal strength of the client node at the AP for a signal transmitted by the client node using a different protocol than the first wireless protocol and comparing said received signal strength indicator to a pre-determined threshold established with respect to the first wireless protocol; and
  a client node power control module generating a power reduction signal for transmission from the AP to the client node to reduce client node transmit power when said received signal strength indication is greater than said threshold.

15. The apparatus recited in claim 14 further comprising:
  a performance monitoring module assessing reception performance of said collocated radio at the AP in said first wireless protocol with said client node transmitting at a reduced transmitted power; said performance monitoring module controlling a signal for remotely terminating said client node transmitted power for an intermittent period of time and comparing reception performance of said collocated radio at the AP in said first wireless protocol with and without client node transmitted power to further reduce client node transmitted power until there is an acceptable difference in performance with and without client node transmitted power.

16. The apparatus recited in claim 14 wherein said power reduction signal comprises a beacon frame element.

17. The apparatus recited in claim 16 wherein said beacon frame element is a Country element.

18. The apparatus recited in claim 16 wherein said beacon frame element is a Power Constraint element.

19. The apparatus of claim 14 wherein said power reduction signal comprises a probe response frame.

20. The apparatus recited in claim 19 wherein said probe response frame is an Extended Power Constraint element.

21. The apparatus recited in claim 15 wherein said performance monitoring module employs signal to interference plus noise ratio to assess reception performance of said collocated radio at the AP in said first wireless protocol.

22. The apparatus recited in claim 15 wherein said performance monitoring module employs packet error ratio to assess reception performance of said collocated radio at the AP in said first wireless protocol.

23. The apparatus of claim 15 wherein said signal for remotely terminating client node transmitted power for an intermittent period of time is a clear to send to self (CTS2S) signal.

24. The apparatus of claim 14 wherein said first wireless protocol comprises Bluetooth protocol.

25. The apparatus of claim 14 wherein said first wireless protocol comprises a long term evolution (LTE) system protocol.

26. A wireless network having an access point AP having multiple radios at least one of which operates using a first wireless protocol and at least one other of which operates to communicate with a remote client node; the AP comprising a device for monitoring received power for a signal transmitted by the client node using a different protocol than the first wireless protocol and comparing said received power with a threshold established with respect to the first wireless protocol;
  the AP further comprising a device for transmitting a power reduction signal to said remote client node to reduce transmit power whenever said received power is greater than said threshold; and
  a device for assessing performance of said at least one other radio for continuing to transmit said power reduction signal further reducing said client node transmit power until said performance is acceptable.

27. The wireless network of claim 26 wherein said device for assessing performance comprises means for intermittently terminating client node transmit power to enable said device for assessing performance to compare said performance with and without client node transmit power.

* * * * *